United States Patent
Lin

(10) Patent No.: US 9,310,574 B2
(45) Date of Patent: Apr. 12, 2016

(54) MULTIMEDIA DATA TRANSMISSION DEVICE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/531,046

(22) Filed: Nov. 3, 2014

(65) Prior Publication Data

US 2015/0153528 A1 Jun. 4, 2015

(30) Foreign Application Priority Data

Nov. 30, 2013 (CN) .......................... 2013 1 0622199

(51) Int. Cl.
*G02B 6/36* (2006.01)
*G02B 6/42* (2006.01)

(52) U.S. Cl.
CPC ............ *G02B 6/4292* (2013.01); *G02B 6/4214* (2013.01); *G02B 6/4284* (2013.01); *G02B 6/4249* (2013.01)

(58) Field of Classification Search
CPC ....... G02B 6/43; G02B 6/4204; G02B 6/4292
USPC ...................................................... 385/88–93
See application file for complete search history.

(56) References Cited

U.S. PATENT DOCUMENTS

| 8,888,380 | B2 * | 11/2014 | Hung et al. ..................... 385/89 |
| 9,033,592 | B2 * | 5/2015 | Arao et al. ...................... 385/89 |
| 2003/0091297 | A1 * | 5/2003 | Hung et al. ..................... 385/83 |
| 2008/0044141 | A1 * | 2/2008 | Willis et al. ..................... 385/88 |
| 2011/0200284 | A1 * | 8/2011 | Zhovnirovsky et al. ........ 385/33 |
| 2012/0155809 | A1 * | 6/2012 | Yu et al. .......................... 385/74 |

* cited by examiner

*Primary Examiner* — Ellen Kim
(74) *Attorney, Agent, or Firm* — Novak Druce Connolly Bove + Quigg LLP

(57) ABSTRACT

A multimedia data transmission device configured for connecting a data source and a multimedia display device includes a first connection terminal, a second connection terminal, and a transmission cable. The first connection terminal is electrically connected to the data source. The second connection terminal is optically coupled with the multimedia display device. The transmission cable is optically interconnected between the first connection terminal and the second connection terminal.

8 Claims, 10 Drawing Sheets

MULTIMEDIA DATA TRANSMISSION DEVICE

FIELD

The subject matter herein generally relates to a multimedia data transmission device.

BACKGROUND

A multimedia data transmission device is used to transmit multimedia data between two storage devices, or a storage device and a display device. The multimedia data transmission device includes a transmission line and two connection terminals.

BRIEF DESCRIPTION OF THE DRAWINGS

Implementations of the present technology will now be described, by way of example only, with reference to the attached figures.

DETAILED DESCRIPTION

Figure 1:
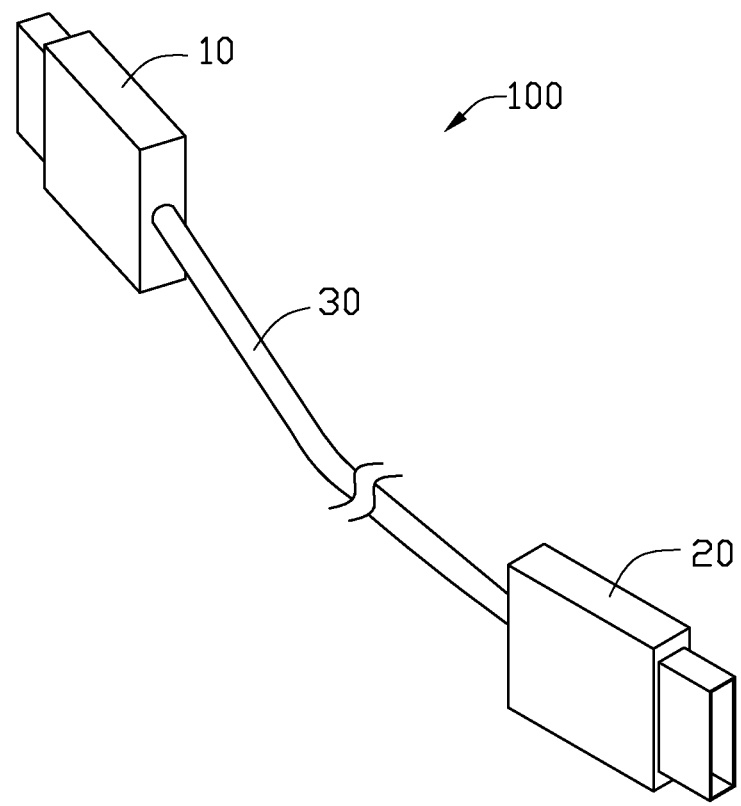
FIG. 1 is an isometric view of an embodiment of a multimedia data transmission device, including a first connection terminal and a second connection terminal.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a multimedia data transmission device configured for connecting a data source and a multimedia display device. The multimedia data transmission device comprises a first connection terminal, a second connection terminal, and a transmission cable. The first connection terminal is electrically connected to the data source. The first connection terminal comprises a first body, an optical fiber connector, and a conductive member. The optical fiber connector and the conductive member are received in the first body. The conductive member is exposed from the first body. The optical fiber connector comprises a first photoelectric conversion module and a first receiving member. The first photoelectric conversion module comprises a first optical coupling member, a plurality of first light emitting members, a plurality of first light receiving members, and a first circuit board. The first optical coupling member is inserted into the first receiving member. The first light emitting members and the first light receiving members are arranged on the first circuit board. The first circuit board is electrically connected to the conductive member. The second connection terminal is optically coupled to the multimedia display device. The second connection terminal comprises a second body and a second receiving member. The second receiving member is received in the second body and exposed from the second body. The transmission cable is connected between the first connection terminal and the second connection terminal. The transmission cable comprises a plurality of first optical fibers corresponding to the first light emitting members and a plurality of second optical fibers corresponding to the first light receiving members. An end of each first optical fiber and an end of each second optical fiber are inserted into the first receiving member. The other end of each first optical fiber and the other end of each second optical fiber are inserted into the second receiving member.

FIG. 1 illustrates a multimedia data transmission device (data cable) 100 of an embodiment. The multimedia data transmission device 100 includes a first connection terminal 10, a second connection terminal 20, and a transmission cable 30. The transmission cable 30 is interconnected between the first connection terminal 10 and the second connection terminal 20.

Figure 2:
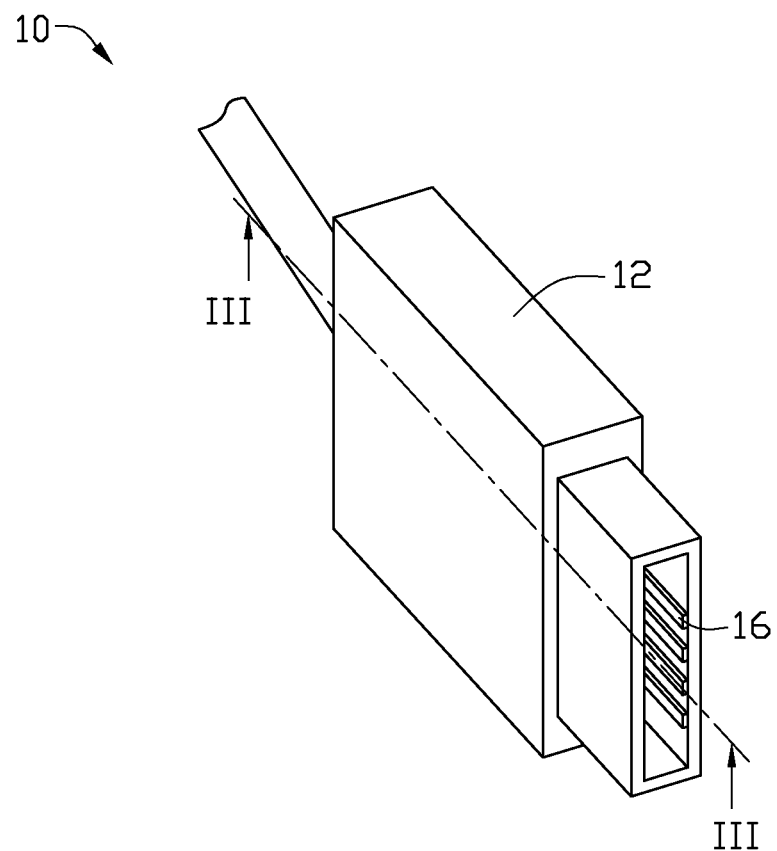
FIG. 2 is an isometric view of the first connection terminal of FIG. 1.
Figure 3:
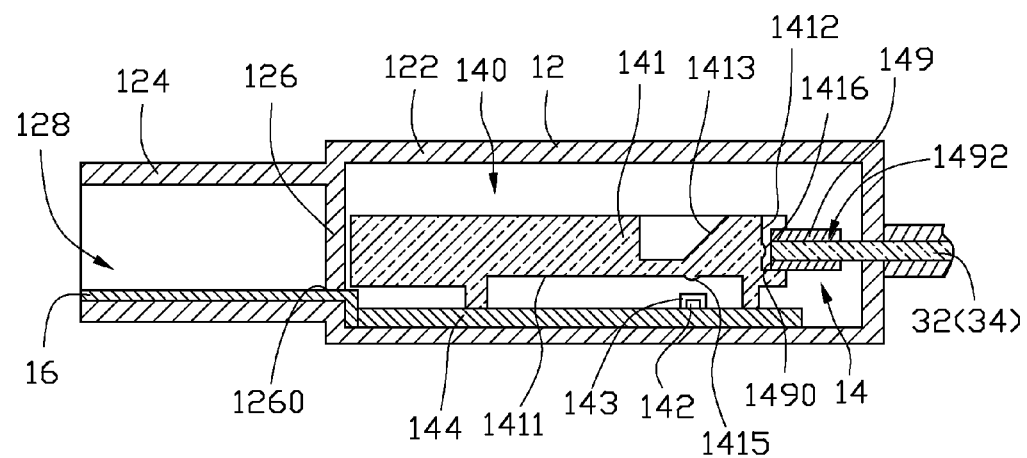
FIG. 3 is a cross-sectional view of the first connection terminal taken along line III-III of FIG. 2, wherein the first connection terminal includes a first photoelectric conversion module.

FIGS. 2 and 3 illustrate that the first connection terminal 10 includes a first body 12, an optical fiber connector 14 and a conductive member 16. The optical fiber connector 14 and the conductive member 16 are received in the first body 12.

The first body 12 includes a receiving portion 122, an inserting portion 124, and a baffle 126. The baffle 126 is positioned between and separates the receiving portion 122 and the inserting portion 124. An opening 128 is defined in the inserting portion 124 opposite to the baffle 126. The optical fiber connector 14 is received in the receiving portion 122. The conductive member 16 is received in the inserting portion 124, and is accessible by the external environment via the opening 128. In at least one embodiment, a through hole 1260 is defined in the baffle 126. The conductive member 16 passes through the through hole 1260 and is electrically connected to the optical fiber connector 14. In at least one embodiment, the receiving portion 122, the inserting portion 124, and the baffle 126 form into a unitary configuration.

Figure 4:
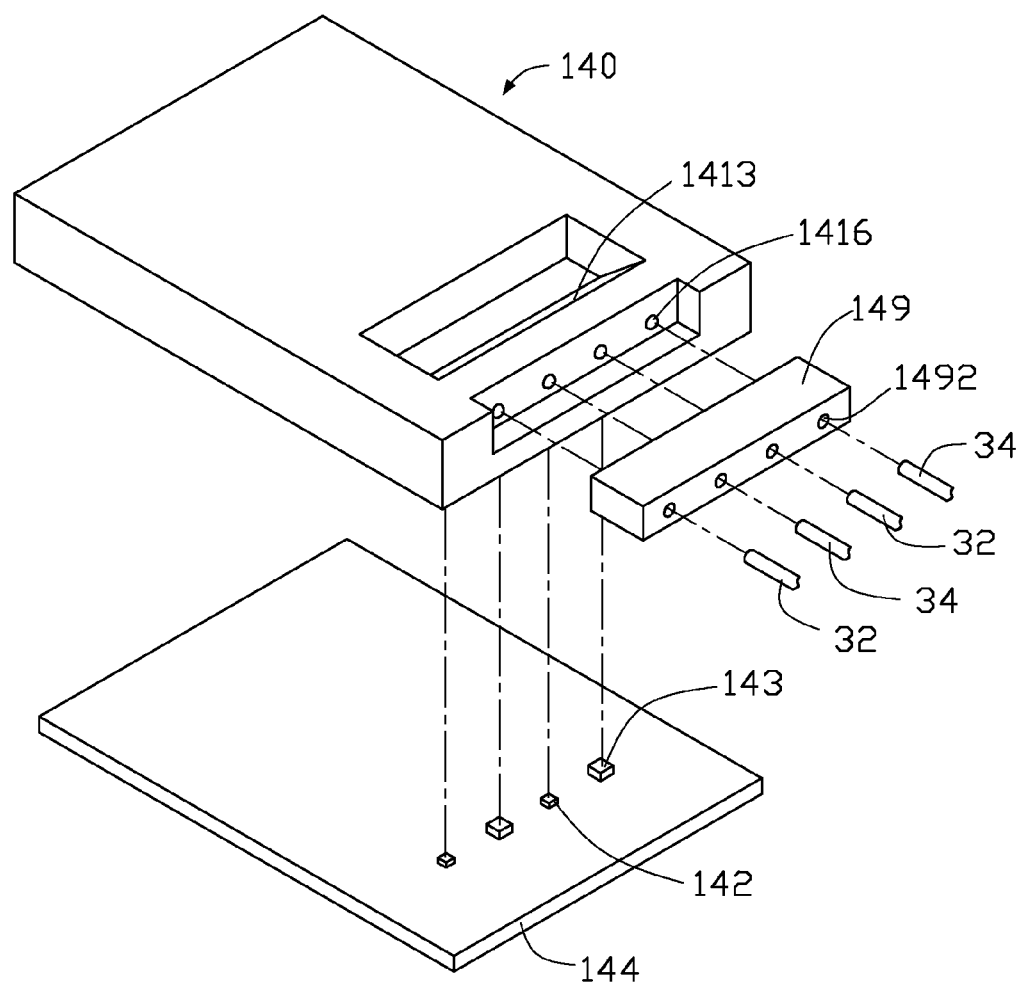
FIG. 4 is an exploded view of the first photoelectric conversion module of FIG. 3.
Figure 5:
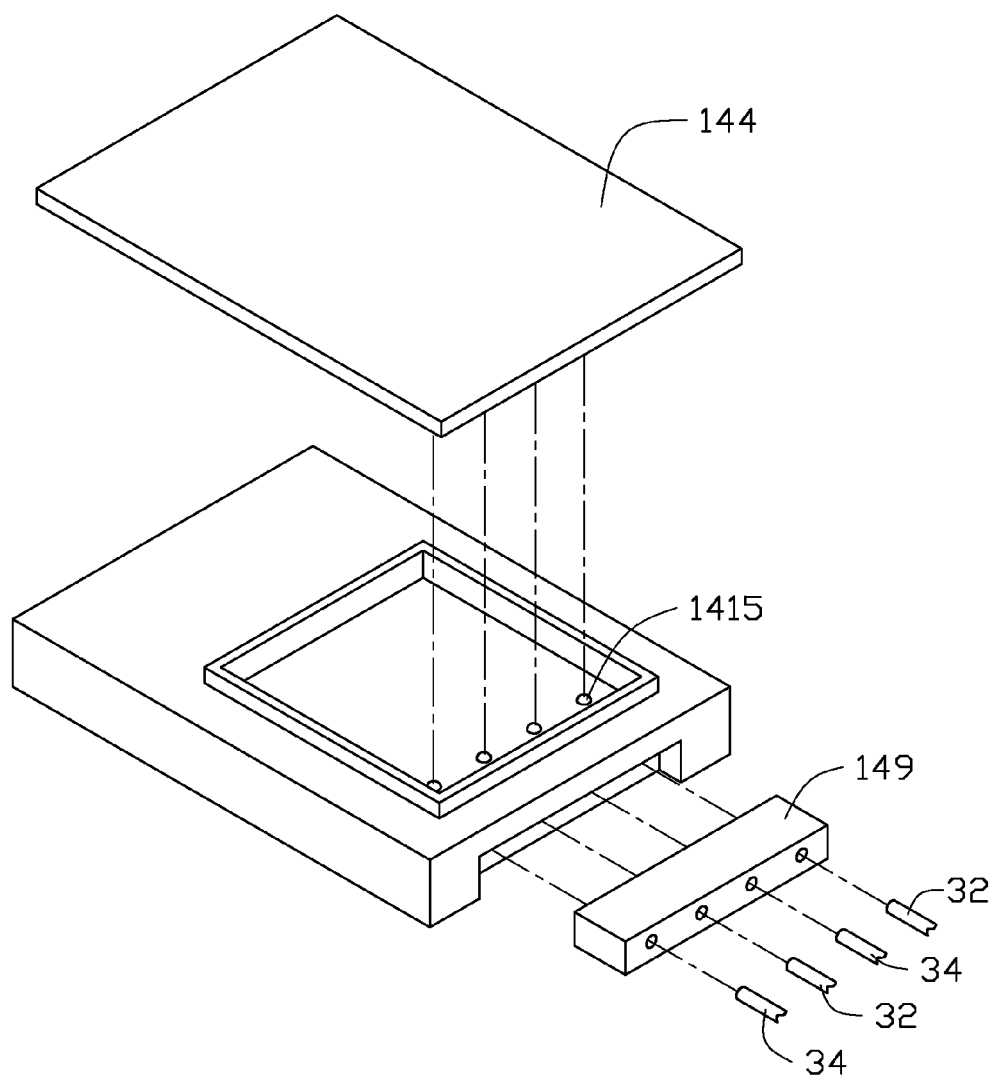
FIG. 5 is an exploded view of the first photoelectric conversion module of FIG. 3, but viewed from another angle.

FIGS. 4 and 5 illustrate that the optical fiber connector 14 includes a first photoelectric conversion module 140 and a first receiving member 149.

In at least one embodiment, the first photoelectric conversion module 140 includes a first optical coupling member (optical converter) 141, two first light emitting members 142, two first light receiving members 143, and a first circuit board 144. The first light emitting member 142 and the first light receiving member 143 are arranged on the first circuit board 144. The two first light emitting members 142 and the two first light receiving members 143 are arranged in a row and spaced apart from each other. The first optical coupling member 141 is mounted on the first circuit board 144 and positioned above the first light emitting members 142 and the first light receiving members 143. The first optical coupling member 141 includes a first optical surface 1411, a second optical surface 1412, a first reflective surface 1413, four first converging lenses 1415, and four second converging lenses 1416. The first optical surface 1411 is substantially perpendicular to the second optical surface 1412. The first reflective surface 1413 faces the first optical surface 1411 and the second optical surface 1412. An angle between the first optical surface 1411 and the first reflective surface 1413 is about 45 degrees, and an angle between the second optical surface 1412 and the reflective surface 1413 is about 45 degrees. The first converging lenses 1415 are formed on the first optical surface 1411. The second converging lenses 1416 are formed on the second optical surface 1412. Each first converging lens 1415 corresponds to a second converging lens 1416. The first optical surface 1411 faces the first light emitting members 142 and the first light receiving members 143. Two of the four first converging lenses 1415 are aligned with the first light emitting members 142. The other two of the four first converging lenses 1415 are aligned with the first light receiving members 143.

The first receiving member 149 is inserted into the first optical coupling member 141. The transmission cable 30 includes two first optical fibers 32 and two second optical fibers 34. The first and second optical fibers 32 and 34 are received in the first receiving member 149 and are aligned with the first photoelectric conversion module 140. The first receiving member 149 includes a first end surface 1490 and defines a plurality of first receiving holes 1492 passing through the first end surface 1490. An end of each first optical fiber 32 and an end of each second optical fiber 34 are received in the first receiving holes 1492 and extend out of the first receiving holes 1492. The first end surface 1490 faces the second optical surface 1412. The first light emitting members 142 are optically coupled with the first optical fibers 32 via the first optical coupling member 141. The first light receiving members 143 are optically coupled with the second optical fibers 34 via the first optical coupling member 141. In one embodiment, an end surface of each first optical fiber 32 or an end surface of each second optical fiber 34 is located at a focal plane of the second converging lenses 1416.

The conductive member 16 is electrically connected to the first circuit board 144. In one embodiment, the conductive member 16 includes a plurality of conductive strips or conductive pins.

Figure 6:
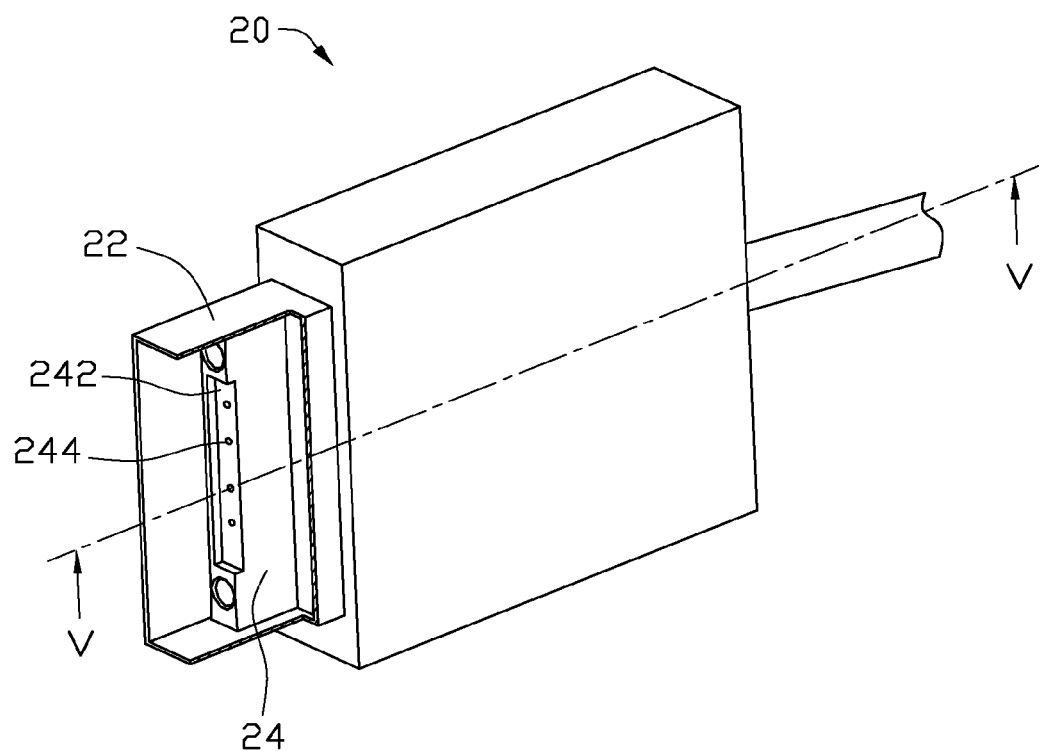
FIG. 6 is an isometric view of the second connection terminal of FIG. 1.
Figure 7:
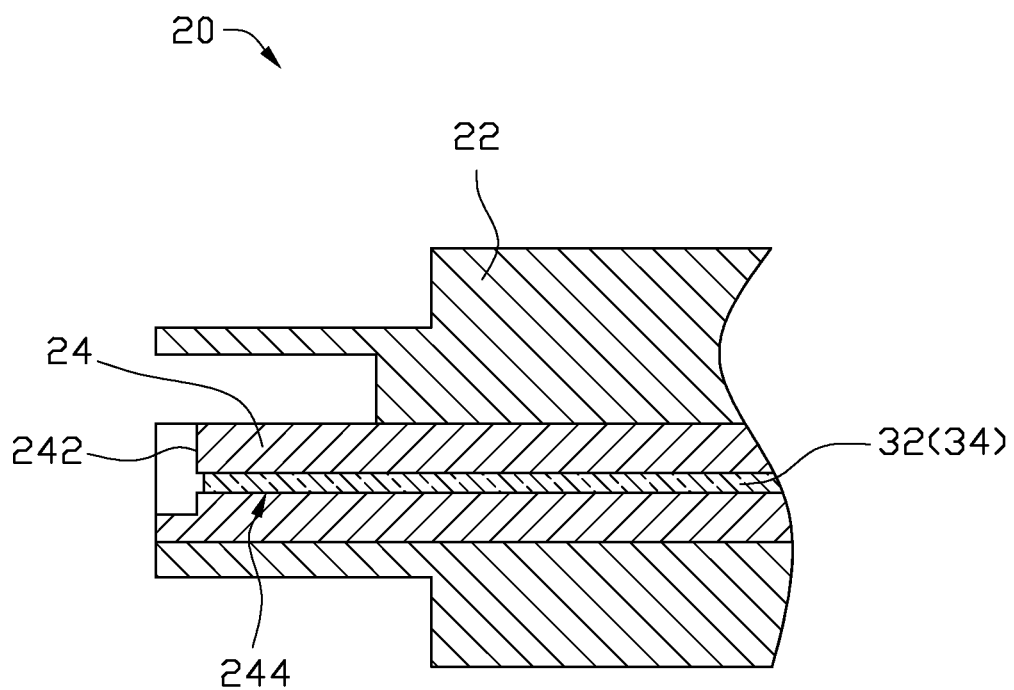
FIG. 7 is a cross-sectional view of the second connection terminal taken along line V-V of FIG. 6.

FIGS. 6 and 7 illustrate that the second connection terminal 20 includes a second body 22 and a second receiving member 24. The second receiving member 24 is received in the second body 22. The second receiving member 24 includes a second end surface 242 and defines a plurality of second receiving holes 244 passing through the second end surface 242. The other end of each first optical fiber 32 and the other end of each second optical fiber 34 are received in the second receiving holes 244 and do not extend out of the receiving holes 242. The second end surface 242 is exposed from the second body 22.

Figure 8:
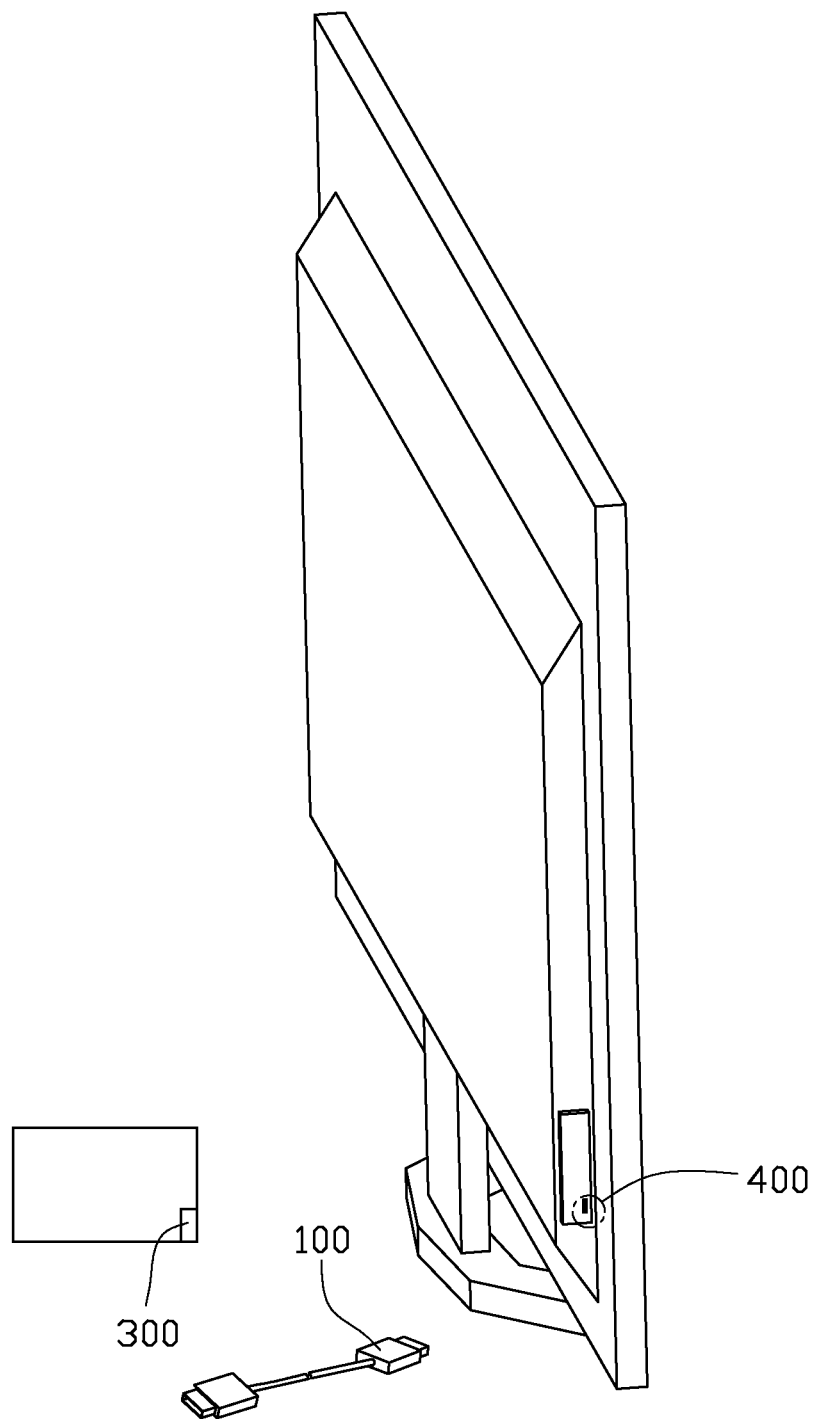
FIG. 8 is an isometric view of the multimedia data transmission device of FIG. 1, showing the multimedia data transmission device interconnected between a multimedia data source and a display device.

FIG. 8 illustrates that the multimedia data transmission device 100 electrically connects a data source 300 to a multimedia display device 400. The first connection terminal 10 is electrically connected to the data source 300 via the conductive member 16.

Figure 9:
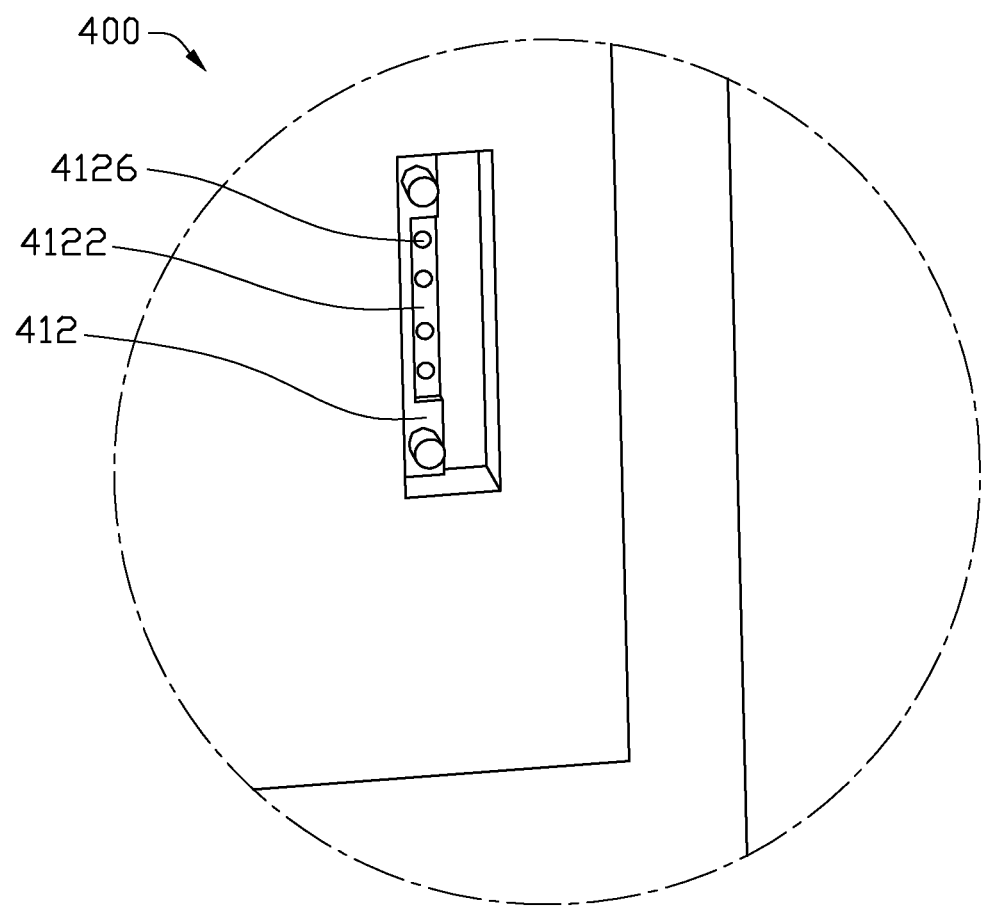
FIG. 9 is an enlarged view of the display device of FIG. 8.
Figure 10:
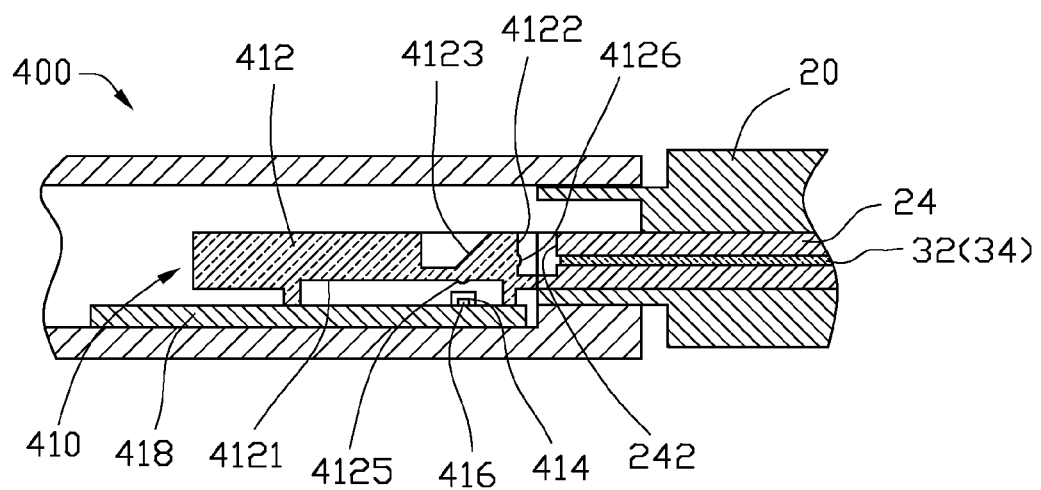
FIG. 10 is a cross-sectional view showing the second connection terminal coupled to the display device of FIG. 8.

FIGS. 9 and 10 illustrate that the multimedia display device 400 is optically coupled with the second connection terminal 20. The multimedia display device 400 includes a second photoelectric conversion module 410. The second photoelectric conversion device 410 includes a second optical coupling member 412, two second light emitting members 414, two second light receiving members 416, and a second circuit board 418. The second light emitting member 414 and the second light receiving member 416 are arranged on the second circuit board 418. The two second light emitting members 414 and the two second light receiving members 416 are arranged in a row and spaced apart from each other. The second optical coupling member 412 is mounted on the second circuit board 418 and positioned above the second light emitting members 414 and the second light receiving members 416. The second optical coupling member 412 includes a third optical surface 4121, a fourth optical surface 4122, a second reflective surface 4123, four third converging lenses 4125, and four fourth converging lenses 4126. The third optical surface 4121 is substantially perpendicular to the fourth optical surface 4122. An angle between the third optical surface 4121 and the second reflective surface 4123 is about 45 degrees, and an angle between the fourth optical surface 4122 and the second reflective surface 4123 is about 45 degrees. The third converging lenses 4125 are formed on the third optical surface 4121. The fourth converging lenses 4126 are formed on the fourth optical surface 4122. Each third converging lens 4125 corresponds to a fourth converging lens 4126. The third optical surface 4121 faces the second light emitting members 414 and the second light receiving members 416. Two of the third converging lenses 4125 are aligned with the second light emitting members 414. The other two of the third converging lenses 4125 are aligned with the second light receiving members 416. The second optical coupling member 412 is inserted into the second receiving member 24. The fourth optical surface 4122 faces the second end surface 242. The other end of each first optical fiber 32 and the other end of each fourth optical fiber 34 are aligned with the fourth converging lenses 4126. The second light emitting members 414 are optically coupled with the second optical fibers 34 via the second optical coupling member 412.

The second light receiving members 416 are optically coupled with the first optical fibers 32 via the second optical coupling member 412.

When operating, the data source 300 transmits electric signals with multimedia data to the first circuit board 144 via the conductive member 16. The first circuit board 144 converts the electric signals into optical signals. The optical signals emit from the first light emitting members 142 toward the corresponding first converging lenses 1415. The optical signals enter the first optical coupling member 141 through the first converging lenses 1415 and are reflected by the first reflective surface 1413 toward the corresponding second converging lenses 1416. The optical signals emit from the first optical coupling member 141 through the corresponding second converging lenses 1416 and enter the corresponding first optical fibers 32. The optical signals enter the second optical coupling member 412 through the corresponding fourth converging lenses 4126 and are reflected by the second reflective surface 4123 toward the corresponding third converging lenses 4125. The optical signals emit from the second optical coupling member 412 through the corresponding third converging lenses 4125 and toward the second light receiving member 416. The second light receiving member 416 converts the optical signals into electric signals and transmits the electric signals to the second circuit board 418. The multimedia display device 400 feeds back electric signals to the second circuit board 418. The second circuit board 418 converts the electric feedback signals into optical signals. The optical signals emit from the second light emitting members 414 toward the corresponding third converging lenses 4125. The optical signals enter the second optical coupling member 412 through the corresponding third converging lenses 4125 and are reflected by the second reflective surface 4123 toward the corresponding fourth converging lenses 4126. The optical signals emit from the second optical coupling member 412 through the corresponding fourth converging lenses 4126 and enter the aligned second optical fibers 34. The optical signals transmit along the corresponding second optical fibers 34 toward the corresponding second converging lenses 1416. The optical signals enter the first optical coupling member 141 through the corresponding second converging lenses 1416 and are reflected by the first reflective surface 1413 toward the corresponding first converging lenses 1415. The optical signals emit from the first optical coupling member 141 through the corresponding first converging lenses 1415 to the aligned first light receiving members 143. The aligned first receiving members 143 convert the optical signals into electric signals and transmit the electric signals to the data source 300 through the conductive member 16.

The embodiments shown and described above are only examples. Many details are often found in the art such as the other features of a multimedia data transmission device.

Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A multimedia data transmission device comprising:
a first connection terminal, comprising a first body, an optical fiber connector and a conductive member received in the first body, the conductive member exposing from the first body, the optical fiber connector comprising a first photoelectric conversion module and a first receiving member, the first photoelectric conversion module comprising a first optical coupling member, a plurality of first light emitting members, a plurality of first light receiving members, and a first circuit board, the first receiving member being inserted into the first optical coupling member, the first light emitting members and the first light receiving members being arranged on the first circuit board, the first circuit board electrically connecting to the conductive member, the first receiving member comprising a plurality of first receiving holes;
a second connection terminal comprising a second body and a second receiving member received in the second body, the second receiving member exposing at the second body, the second receiving member comprising a plurality of second receiving holes; and
a transmission cable interconnected between the first connection terminal and the second connection terminal, the transmission cable comprising a plurality of first optical fibers corresponding to the first light emitting members and a plurality of second optical fibers corresponding to the first light receiving members, an end of each first optical fibers and an end of each second optical fibers being inserted into the first receiving holes of the first receiving member and extending out of the first receiving holes, the other end of each first optical fibers and the other end of each second optical fibers being inserted into the second receiving holes of the second receiving member and being not extending out of the second receiving holes.

2. The multimedia data transmission device of claim 1, wherein the first body comprises a receiving portion, a baffle, and an inserting portion, the baffle is positioned between and separates the receiving portion and the inserting portion, the baffle defines a through hole penetrating the baffle, the inserting portion defines an opening opposite to the baffle, the optical fiber connector is received in the receiving portion, the conductive member is received in the inserting portion, the conductive member passes through the through hole and is electrically connected to the first circuit board, the conductive member is exposed from the opening.

3. The multimedia data transmission device of claim 2, wherein the receiving portion, the baffle, and the inserting portion form into a unitary configuration.

4. The multimedia data transmission device of claim 1, wherein the first receiving member comprises a first end surface, the first receiving holes pass through the first end surface, the second receiving member comprises a second end surface, the second receiving holes pass through the second end surface, the second end surface is exposed from the second body.

5. The multimedia data transmission device of claim 1, wherein the conductive member comprises a plurality of conductive strips, the first connection terminal is electrically connected to a data source via the conductive strips.

6. The multimedia data transmission device of claim 1, wherein the first optical coupling member is mounted on the first circuit board and positioned above the first light emitting members and the first light receiving members, the first optical coupling member is aligned with the first light emitting members and the first light receiving members.

7. The multimedia data transmission device of claim 6, wherein the first optical coupling member comprises a first optical surface, a second optical surface, a first reflective surface, a plurality of first converging lenses, and a plurality of second converging lenses, the second optical surface is perpendicular to the first optical surface, the first reflective surface faces the first optical surface and the second optical surface, an angle between the first optical surface and the first reflective surface and an angle between the second optical surface and the first reflective surface are both acute angles, the first converging lenses are formed on the first optical surface, the second converging lenses are formed on the second optical surface, each second converging lens corresponds to a first converging lens, the first converging lenses are aligned with the first light emitting members and the first light receiving members, the second converging lenses are optically coupled with the first optical fibers and the second optical fibers.

8. The multimedia data transmission device of claim 7, wherein an angle between the first optical surface and the first reflective surface is about 45 degrees, and an angle between the second optical surface and the first reflective surface is about 45 degrees.

* * * * *